United States Patent [19]

Nelson

[11] 4,042,080
[45] Aug. 16, 1977

[54] WHEEL CYLINDER PISTON CONSTRUCTION

[75] Inventor: Richard P. Nelson, Bellbrook, Ohio

[73] Assignee: General Motors Corporation, Detroit, Mich.

[21] Appl. No.: 688,047

[22] Filed: May 19, 1976

[51] Int. Cl.² .............................................. F16D 65/24
[52] U.S. Cl. ..................................... 188/361; 92/245; 92/255; 188/364
[58] Field of Search ................. 188/78, 325, 361, 362, 188/363, 364, 365; 92/219, 229, 245, 255

[56] References Cited

U.S. PATENT DOCUMENTS

| | | | |
|---|---|---|---|
| 2,308,875 | 1/1943 | Goepfrich | 92/245 X |
| 2,366,832 | 1/1945 | Christenson | 92/255 X |
| 2,384,614 | 9/1945 | Forbes | 188/362 X |
| 2,509,643 | 5/1950 | House | 188/364 X |
| 3,112,959 | 12/1963 | Kateley | 92/245 X |

OTHER PUBLICATIONS

*Brake and Front End Service,* vol. 35, No. 12, Dec. 1965, "EIS Announces a New Group of Wheel Cylinder Repair Kits", p. 39.

*Primary Examiner*—Trygve M. Blix
*Assistant Examiner*—Edward R. Kazenske
*Attorney, Agent, or Firm*—D. D. McGraw

[57] ABSTRACT

A wheel cylinder piston made of powdered metal is provided with a through hole and a steel or powdered metal insert of hard metal received in and fills the hole. The hardened insert acts directly against a tang of the brake shoe, eliminating the need for reaction pins. The piston of the assembly is made in a die set having a through rod to define the hole, the piston green preform being sintered and sized before or after the insert is in place.

1 Claim, 4 Drawing Figures

WHEEL CYLINDER PISTON CONSTRUCTION

The invention relates to a piston assembly for a wheel cylinder assembly, and a method for manufacturing the piston assembly. It more particularly relates to a piston formed with a powdered metal body, the body being preformed as a skirted cylinder with a flat end surface on one end, an annular depression on the other end, and a passage extending axially through the body. A hardened insert has a head and a shank, the head covering a center boss formed by an annular depression on one side of the body. The insert shank fits through the passage and is substantially flush with a flat end surface of the piston so that the cup seal which engages the piston flat end is also supported by the end of the insert. The shank of the insert fits tightly in the passage and seals the passage. This arrangement eliminates the insertion of the shank in a blind hole, as has been the previous practice, or in a hole having a closed end, by providing a hole through the entire piston body. The piston can be made of powdered metal by the use of less complex die elements than those required when blind or closed end holes are used. The method embodying the invention includes the performing of powdered metal into a green preform about a rod extending axially between axially spaced dies in a cylindrical confined space. The dies are axially moved relatively closer together to compress the powdered metal in the confined space to the proper degree, forming, with the dies on one side of the green preform, an annular recess. One side of the recess is circumscribed by a piston skirt inner wall and the other side of the recess is defined by the outer wall of a boss surrounding the rod and having an annular end surface. The green preform is removed from the rod and the confined space. The preform may then be sintered, or the headed insert may be placed in the passage before the sintering operation. After sintering, if the insert has not been previously positioned, it is placed in the passage so that its head substantially covers the annular end surface of the boss. The entire piston assembly is then sized.

IN THE DRAWING

Figure 1:
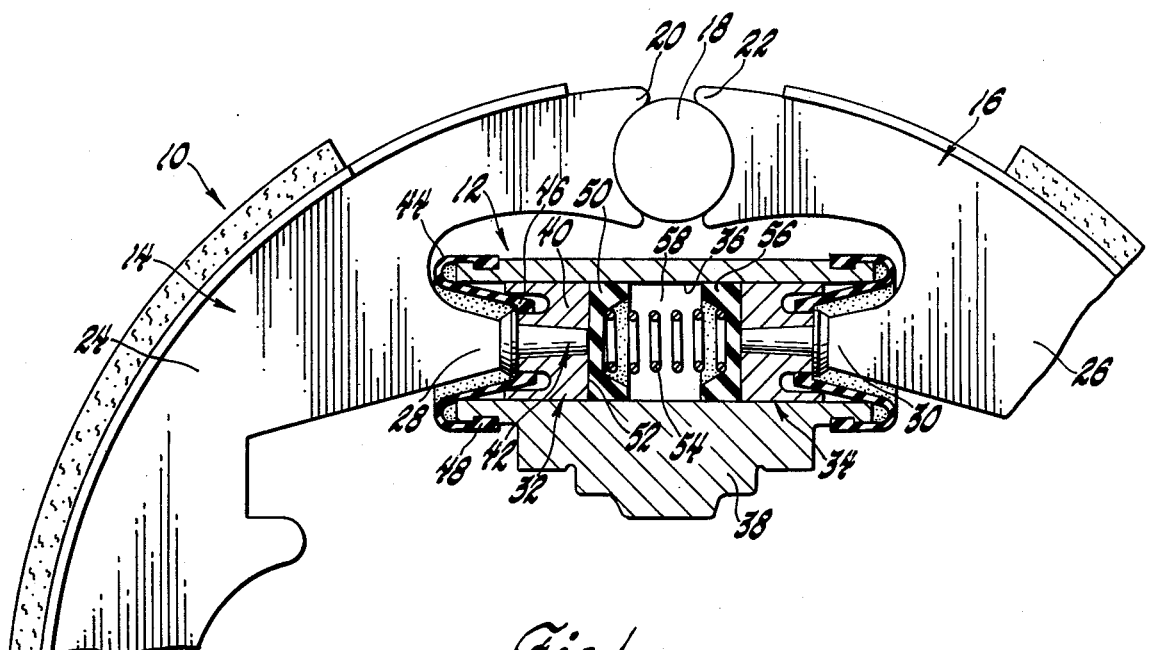
FIG. 1 is an elevation view, with parts broken away and in section, of a drum brake assembly having a wheel cylinder piston assembly embodying the invention.

Brake assembly 10 includes a wheel cylinder assembly 12, brake shoes 14 and 16, and an anchor pin 18. The upper ends 20 and 22, respectively, of shoes 14 and 16 are positioned to engage the anchor pin 18. The web 24 of shoe 14 and the web 26 of shoe 16 are respectively provided with tangs 28 and 30 which engage the piston assemblies of the wheel cylinder assembly 12. Piston assemblies 32 and 34 are respectively positioned in the wheel cylinder bore 36 formed in wheel cylinder body 38. Since the piston assemblies are substantially identical, only piston assembly 32 will be further described. The assembly 32 includes piston 40 and a headed insert 42. A wheel cylinder boot 44 is positioned so that its inner periphery 46 seals against a part of the piston 40 and its outer periphery 48 is secured to the wheel cylinder body 38. A cup seal 50 is positioned in bore 36 so that it is supported by the piston end surface 52. A spring 54 acts to hold cup seal 50 in place and engages a similar cup seal 56 similarly associated with piston 34. Spring 54 is positioned in the pressure chamber 58 into which pressurized fluid is introduced to actuate the brake.

Figure 2:
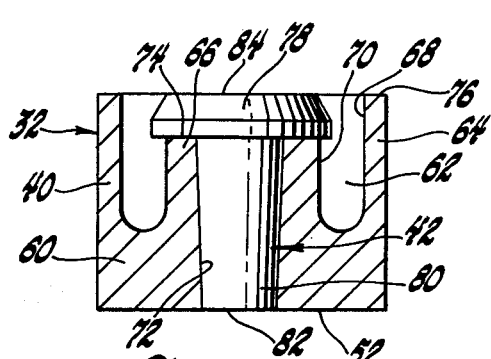
FIG. 2 is a cross-section view showing the piston assembly of FIG. 1 in a larger scale.

Piston assembly 32 is illustrated in greater detail in FIG. 2. The piston body 60 has flat end surface 52 on one end and an annular depression 62 on the other end. The piston body includes a skirt 64 and a boss 66. Annular depression 62 has its outer side wall 68 forming the inner wall of skirt 64, and its inner side wall 70 forming the outer wall of boss 66. The piston body has a passage 72 extending axially therethrough, the passage also passing axially through boss 66. The annular boss end 74 is spaced axially inward of the annular end 76 of skirt 64. The hardened insert 42 includes a head 78 and a shank 80. The insert extends through passage 72 with the shank end 82 being substantially flush with the piston body flat end surface 52 to form a continuation of that surface. The shank fits tightly into and seals passage 72, holding the insert in place. The insert head 78 covers the boss end 74 to provide a hard wear surface 84 engaged by tang 28 of shoe 14.

Figure 3:
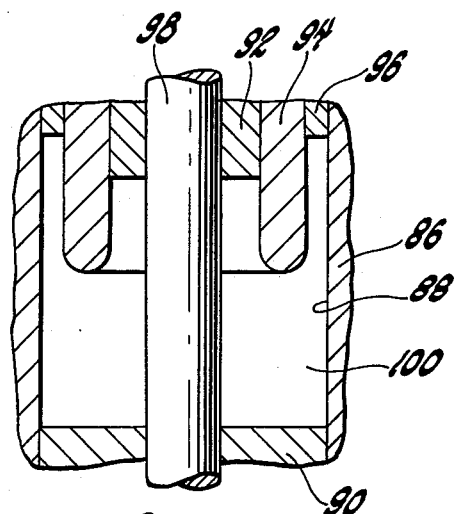
FIG. 3 illustrates the mechanism used in the method of manufacture of the piston, before the powdered metal is placed in the cylindrical space.
Figure 4:
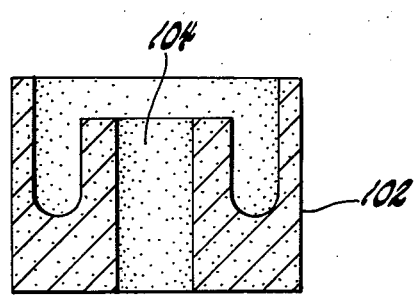
FIG. 4 illustrates a green preform which has been removed from the dies of the mechanism of FIG. 3.

The mechanism for making the piston assembly 32 is illustrated in FIG. 3. It includes a body 86 having cylinder 88 formed therein. A die 90 closes one end of cylinder 88 and concentric dies 92, 94 and 96 close the other end of cylinder 88, dies 90 and 92 having a rod 98 passing axially therethrough and through cylinder 88. Thus the dies, cylinder and rod define a confined space 100. Powdered metal is introduced into space 100 and the dies are axially moved relatively closer together to compress the powdered metal in the confined space. Die 92 assists in forming the boss end 74. Die 94 assists in forming an annular depression 62. Die 96 assists in forming the piston in skirt annular end 76. These dies may be moved relative to each other to obtain the proper formation and compactness of the powdered metal. The resulting green preform 102, illustrated in FIG. 4, is removed from the rod 98 and the confined space 100 to expose the tubular passage 104 which extends completely through the green preform.

In one manner of practicing the method embodying the invention, the headed insert 42 has its shank 80 inserted in tubular passage 104 at this time so that it substantially fills the passage and its head covers the boss annular end surface. The green preform may then be sintered and the piston assembly sized so that the completed assembly is as described above with regard to FIGS. 1 and 2. Alternatively, the insert may be positioned in tubular passage 104 after sintering the green preform and concurrently with the sizing of the piston assembly.

It can be seen that the resulting piston assembly has no blind hole or closed recess ends under the insert 42 which may trap air in a portion of a brake system normally containing only brake fluid, and still provides complete surface support for cup seal 50. The assembly is made with a simpler die arrangement than that required when blind recesses are made for receiving the hardened insert since no separate die section has to be provided, with its appropriate movement, to define the blind recess in which the insert shank extends.

What is claimed is:

1. A piston assembly for use in a hydraulic wheel cylinder assembly for a brake, said piston assembly having a powdered metal piston body preformed as a skirted cylinder with a flat end surface on one end and an annular depression on the other end and a passage extending axially therethrough and through said flat end surface, said annular depression having side walls, said flat end surface being adapted to engage and axially support a cup seal, the side walls of the annular depression defining the cylinder skirt interior wall and the outer wall of a center boss which surrounds the passage; and a hardened insert having a head and a tapered shank with a flat shank end, said shank being tapered from said head to said end, said head covering said center boss to provide a hard wear surface for an operating component of the brake, said shank end fitting substantially flush with said flat end surface whereby no air pocket at the shank end is formed which will trap air in a hydraulic wheel cylinder assembly, said shank fitting tightly into and sealing said passage for holding said insert in place during operation of the brake.

* * * * *